Dec. 8, 1964 R. H. PACKARD 3,160,807

SERIES CASCADES OF TRANSISTORS

Filed Sept. 22, 1958

Inventor
Robert H. Packard
by Roberts, Cushman & Grover,
Att'ys

United States Patent Office 3,160,807
Patented Dec. 8, 1964

3,160,807
SERIES CASCADES OF TRANSISTORS
Robert H. Packard, Lexington, Mass., assignor to Technical Operations, Inc., a corporation of Delaware
Filed Sept. 22, 1958, Ser. No. 762,599
24 Claims. (Cl. 323—22)

The field of the present invention relates to electrical apparatus that utilizes semi-conductor devices, more particularly to transistor cascades.

It is frequently desirable to operate transistors in series or in parallel in order to be able to use them at higher collector voltages or at higher collector dissipations than one single transistor could withstand. Arrangements of this type present the problem of dividing or controlling the voltage or power dissipation, respectively, in such a manner that the maximum voltage or current rating of any individual transistor is never exceeded. Transistor operation in parallel has been suggested in various forms, and in such arrangements equal current division can be accomplished by connecting the collectors and bases of the transistors in parallel and by inserting small series resistors in the emitters which automatically adjust the base to emitter voltages so that each transistor of a pair takes half the total current and accordingly half the power. The so-called Darlington connection such as described on page 130 of "Transistor Circuit Engineering" edited by Richard F. Shea, Wiley, 1957, is an example of such a device.

In the case of series connected transistors, herein referred to as transistor cascades, the problem is however more complex. It has been proposed to connect the bases of a series of transistors to individual voltage dividers each connected across the entire series, but such arrangements have various disadvantages, principally that of equal voltage division between the regulated transistors only at one value of load current, unless power is wasted by using voltage dividers of very low resistance, while at other load currents more than twice as much power may be dissipated in one transistor than in another, such that some transistors become easily subjected to serious overheating.

Objects of the present invention are to provide transistor series cascades wherein the total voltage across, or the total power dissipated in a cascade will be divided among the individual transistors of the cascade in predetermined portions; to provide, if desired, limitation of the transistor series voltage drops to a predetermined maximum which is harmless to the transistor type being used; to provide series cascades whose components will not have to assume unusually high and possibly detrimental loads; to provide such an arrangement which is particularly applicable to the regulation of power supplies; and generally to provide series cascade transistor components for various applications which permit the safe utilization of favorable properties of all types of transistors for voltages at which they could otherwise not be employed, in a manner which is comparatively simple and inexpensive and nevertheless precise and rugged in operation.

A brief summary indicating the nature and substance of the invention in some of its principal aspects is as follows:

Cascades of transistors according to the invention comprise the combination of a plurality of regulating transistor means arranged in series with the emitter terminal of a transistor means connected to the collector terminal of an adjacent transistor means, with a plurality of limiting resistance means directly connected between the bases or bases and emitters of adjacent limiting transistor means, it being understood that it is not absolutely necessary to connect all transistors of the cascade with such limiting resistor means, it being sometimes possible to accomplish the desired effect by inserting a single resistance means between adjacent transistors. This combination permits varying the voltage drop between two points of a line through varying the base to collector or emitter voltage of each transistor means depending upon a signal derived from a sensing driving means and applied at least to an end transistor of the series cascade.

In an important embodiment of the invention the resistance means are of the type having substantially equal conductivity in either direction over a wide range, such as conventional ohmic resistors.

Another very important embodiment of the invention uses as resistance means apparatus that becomes appreciably conductive only above a predetermined voltage; such resistance means are, in contradistinction to the above mentioned conventional ohmic resistors.

In a particularly important practical embodiment, the above characterized combination of series connected transistor means and limiting resistance means is further combined with equalizing resistance means that are connected between emitters and collectors of adjacent transistor means, it being however understood that is not absolutely necessary that such resistors are inserted between each pair of the regulating transistor cascade. This important embodiment can be further improved by making the resistances of the equalizing resistor means which are connected to the end transistor means (that is that which is connected to the driving means) lower than those of equalizing resistor means between regulating transistors further removed within the cascade.

While the above characterized series cascade transistor arrangement has various practical applications as will be pointed out below, it is particularly suitable for incorporation in regulators for maintaining a constant voltage at the input terminals of a load. Such devices comprise, in combination with any one of the above characterized transistor cascades, a network connected to the regulated terminals for sensing and preferably amplifying voltage fluctuations and supplying a signal that is dependent on such fluctuations, a driving transistor means controlled by the signal and connected to control the end transistor means of the series cascade means, the transistor cascade being equipped with limiting resistor means and preferably also with equalizing resistor means, both as characterized above.

These and other objects and novel aspects of the invention will appear from the herein presented outline of its principle and mode of operation together with a detailed description of three practical embodiments illustrating its novel characteristics, and of various modifications and improvements of the basic circuits.

The description refers to a drawing in which.

The description will first outline considerations which are common to all embodiments and possibilities of further development of the invention, will then specifically describe the construction and operation of two basic embodiments, and will finally describe some of the more or less important modifications which can be derived from the basic embodiments and which constitute additional individual aspects of the invention.

Common to all embodiments of the invention is the direct connection of two or more regulating cascade transistor means of a series to limiting resistance means, in such a manner that the entire voltage drop cannot possibly appear across a single transistor of the cascade, overloading and destroying it.

The components herein referred to as regulating transistor means will usually consist of individual transistors, but it is expressly understood that transistor groups such as the above mentioned arrangements with parallel connected transistors can be used.

The herein described embodiments show PNP transistors, but it will be understood that NPN transistors are equally applicable merely with a reversal of polarity throughout, in accordance with well known principles.

The last stage of the arrangement for driving the regulating transistor cascade is in the herein illustrated embodiments similar to the above referred to Darlington compound connection, but it will be understood that any suitable arrangement for applying to the cascade a signal from a sensing network can be used.

The voltage dependent resistance or reference voltage means which are herein employed as limiting resistance means as well as for auxiliary purposes can be of any suitable type, including diodes (sometimes referred to as breakdown or Zener diodes but herein preferably, because more aptly, referred to as avalanche diodes) voltage regulator tubes, and batteries.

As mentioned above, the principle of the invention is herein illustrated by way of a voltage regulating circuit. This circuit—apart from its combination with the series cascade according to invention—is well known and for example explained on page 431 of the above mentioned textbook by Shea. The feedback amplifier referred to in this context can be of any suitable conventional type.

The nature and the electrical connections of the elements of each one of the circuit components of the various specific embodiment herein described are clearly shown in the respective figures whereas the exact structural characteristics or numerical values and ratings, so far as material for the proper operation of the device, are identified in lists which refer to the legends of the figures, it being understood that adjustments and mutual correlations may have to be applied upon initial testing for proper performance according to routine practice in the manufacture of devices of this type.

Figure 1:
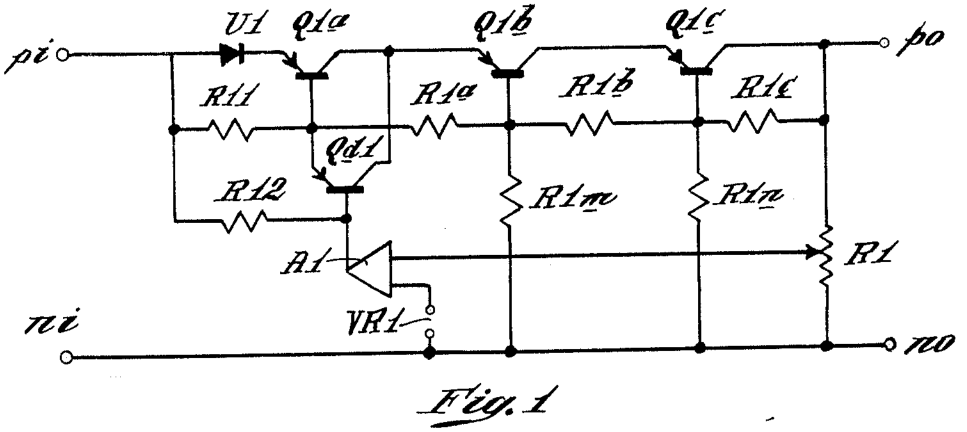
FIG. 1 is a circuit diagram of a series transistor cascade wherein the voltage and dissipation control according to the invention is accomplished by means of symmetrically conducting resistance means.

The embodiment according to FIG. 1 has a cascade consisting of the regulating transistors Q1*a*, Q1*b* Q1*c*, . . .; the resistors R1*a*, R1*b*, R1*c*, . . . represent the limiting resistor means according to the invention; and R11, R12, and R1*m*, and R1*n*, are limiting bias resistors. The potentiometer R1, the reference voltage device VR1, the feedback amplifier A1 and the transistor Q*d*1 constitute a voltage fluctuation sensing and amplifying network; as mentioned above, if the last stage of this network is a transistor connected as shown for Q*d*1, the group Q*d*1–Q1*a* can be considered to constitute a compound unit of the Darlington type. It will be understood that, as indicated above, any number of transistors Q1, such as Q1*a* and Q1*b* only or any desired number beyond Q1*c*, can be employed.

The types and numerical values of the components of an operative circuit according to FIG. 1 are as follows.

| | |
|---|---|
| Transistors Q1*a*, Q1*b*, Q1*c* | Delco 2N174. |
| Transistor Q*d*1 | CBS 2N158. |
| Resistor R1*a* | 500 ohm. |
| Resistor R1*b* | 1000 ohm. |
| Resistor R1*c* | 2000 ohm. |
| Resistor R11 | 5 ohm. |
| Resistor R12 | 1500 ohm. |
| Resistors R1*m*, R1*n*, R1 | 10,000 ohm. |
| Diode U1 | Transitron TM4. |
| Amplifier A1 | Conventional vacuum tube or transistor D.C. |
| Reference voltage VR1 | Gas tube, type 5651. |
| Design input voltage | 310 to 370 volt. |
| Range of regulated output voltage | 280.0 to 280.1 volt. |

The operation of this circuit is as follows:

The resistors R1*m*, R1*n*, are so chosen that, as the input voltage across *ni* and *pi* increases to the point where regulation begins (here 295 volts), the voltage drops across Q1*a*, Q1*b*, Q1*c* are at the desired minimum (in the present instance about one volt each), while the current through the cascade is at the maximum desired value (here about 1500 ma.). The resistors R1*a*, R1*b*, R1*c* are so selected or adjusted that the transistors Q1*a*, Q1*b*, Q1*c* divide the voltage drop on the cascade line between *pi* and *po* equally when the cascade current is at the desired rated minimum value (here about 500 ma.).

In this manner, equal division of the voltages across the respective transistors is assured when the voltage across the cascade from *pi* to *po* is highest, so that each transistor is protected against individual over-voltage. Due to the above mentioned selection of the resistors R1*m*, R1*n* equal division also exists at maximum cascade current, when this equal division between the power dissipation of the transistors is extremely important to prevent overheating. At intermediate voltage levels the division is not equal, but this fact is of little importance since at these levels the regulating transistors are not endangered by an over-voltage which, by definition of the selected resistances, could only exist when the voltages are actually equally divided; this however, again by definition through proper dimenisioning, can not occur above the desired maximum cascade current.

The regulating device, such as a resistor but preferably a forward diode or an avalanche diode, U1 has the purpose of self-protection of the circuit. As the load current approaches zero the drop across U1 vanishes and thus the reverse bias voltage for all regulating transistors likewise disappears. This results in a reduction of the valtoge drop across all regulating transistors to a value which is safe at no load even though regulation ceases.

Figure 2:
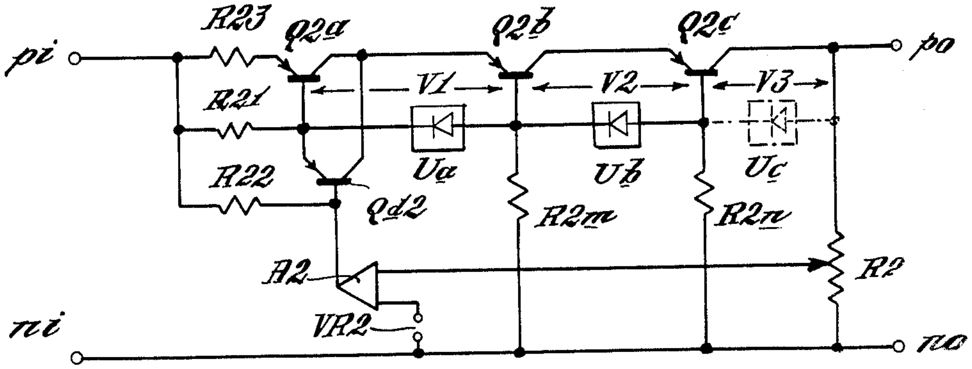
FIG. 2 is a circuit diagram similar to that of FIG. 1 wherein unsymmetrically conducting resistance means such as diodes are used.

The embodiment according to FIG. 2 has cascade transistors labeled Q2*a*, Q2*b*, Q2*c*, . . . similar to FIG. 1, but the ohmic limiting resistors R1*a*, etc. of FIG. 1 are here replaced by voltage limited resistance means such as avalanche diodes U*a*, U*b*, U*c*. R21, R22, R2*m*, R2*n*, . . . are biasing and voltage limiting resistors corresponding to those analogously numbered in FIG 1. The potentiometer R2, the reference voltage divider VR2, the feedback amplifier A2, and the driver stage represented by the transistor Q*d*2 correspond to similar components of the circuit according to FIG. 1 and constitute a voltage fluctuation sensing and amplifying network. Again it will be understood that any number of transistors Q2*a*, etc., such as a pair of transistors Q2*a* and Q2*b*, or any desired number beyond Q2*c* can be employed.

The types and numerical values of the components of a working circuit according to FIG. 2 are as follows.

| | |
|---|---|
| Transistors Q2*a*, Q2*b*, Q2*c* | Delco 2N174. |
| Diodes U*a*, U*b*, U*c* | Transitron SV–924. |
| Resistor R21 | 22 ohm. |
| Resistor R22 | 1500 ohm. |
| Resistors R2*m*, R2*n* | 10K ohm. |
| Resistor R2 | 10K ohm. |
| Resistor R23 | 3 ohm. |
| Amplifier A2 | Conventional vacuum tube, or transistor D.C. |
| Reference voltage VR2 | Gas tube, type 5651. |
| Design input voltage | 310 to 370 v. |
| Range of regulation | 280.0 to 280.1 v. |

The operation of the embodiment according to FIG. 2 is as follows.

Similarly as described above with reference to FIG. 1, the resistors R2*m*, R2*n* are so chosen that the transistors Q2*a*, Q2*b*, Q2*c* are held to a maximum voltage drop depending on the selected breakdown voltage ratings of the diodes U*a*, U*b*, whose voltage ratings correspond to the ratings of resistors R1*a* etc. of FIG. 1.

As the input voltage across terminals *pi* and *ni* increases from a value below the point where regulation begins (here approximately 295 volts) the voltage V1, as marked in FIG. 2, begins to rise until it approximately equals the rated voltage of the diode U*a*. During that period the voltages V2, V3 stay at a low value such as at about one volt in the present instance, due to the blocking action of U*a*. Due to the inherent characteristics of the diode U*a* (or a circuit element of similar properties) the voltage V1 then stops rising and V2 begins to increase until it too reaches the voltage determined by the voltage limited resistance element at this stage, namely U*b*. Thereafter V3 begins to rise, and so on, depending on the number of transistors used in the series cascade together with a corresponding number of breakdown resistance elements connected across their bases. It will now be evident that this number depends on the voltage *pi* to *po* that has to be divided by the cascade.

In this manner the maximum voltage and the maximum power dissipated by each of the transistors can be limited to a safe level which is fixed independently of the amount of voltage fluctuation. It will now be evident that in the circuit according to FIG. 1 the cascade transistor voltages vary simultaneously whereas in the circuit according to FIG. 2 only one varies with the adjacent ones constant until the regulating function is taken over by an adjacent one.

Modifications of various types will now be described.

Figure 3:
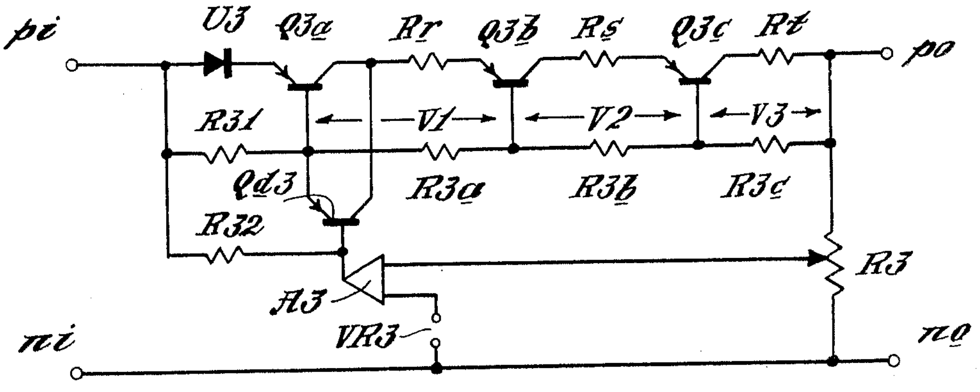
FIG. 3 is a circuit diagram similar to that of FIG. 1, but improved to provide equal voltage division at all currents.

FIG. 3 illustrates an important further development of the circuit according to FIG. 1, which improvement was found to be particularly advantageous. In accordance with this aspect of the invention, equalizing resistor means R*r*, R*s*, R*t*, . . . have been added between the transistors Q3*a*, Q3*b*, Q3*c*, . . .

The types and numerical values of the components of a working circuit according to FIG. 3 are as follows.

| | |
|---|---|
| Transistors Q3*a*, Q3*b*, Q3*c* | Delco 2N174. |
| Resistors R3*a*, R3*b*, R3*c* | 200 ohm. |
| Diode U3 | Transitron TM4. |
| Resistor R31 | 5 ohm. |
| Resistor R32 | 1500 ohm. |
| Resistor R*r* | Zero. |
| Resistor R*s* | 4 ohm. |
| Resistor R*t* | 8 ohm. |
| Amplifier A3 | Conventional vacuum tube, or transistor amplifier D.C. |
| Reference voltage VR3 in series, three | Hoffman 1N429. |
| Design input voltage | 310 to 370 v. |
| Range of regulation | 280.0 to 280.1 v. |

The resistors R*r*, R*s*, R*t* act as self-biasing resistors which help to retain a low voltage across the respective transistor base to collector junction, while the current is high. Generally speaking, in this circuit, as the current increases in the load and likewise through the equalizing resistors R*r*, R*s*, R*t*, . . . the base voltage of the respective transistor (for example transistor Q3*b* corresponding to resistor R*s*) is made more negative so that its base current increases, tending to reduce the emitter to collector voltage of the transistor, here for example Q3*b*.

Having in mind that a similar effect occurs with respect to all cascade transistors and equalizing resistors, and that the resistor R3*c* carries the total base current of transistors Q3*c* and Q3*b* as well as the current through resistor R3*a*, it will be evident that the voltage drop across R3*c* is higher than that across R3*b*. Consequently, R*t* must have a higher resistance value than R*s* in order to keep the voltages V1, V2 and V3 at all times approximately equal as the load current or input voltage vary. The above given values of the resistors R*r*, R*s*, and R*t* are selected according to this principle. This proper proportioning of these resistors makes it possible to divide the voltages very accurately at all currents.

With the input voltage across *pi* and *ni* at or just below the beginning of regulation, and with maximum current in the load, the resistors R*r*, R*s*, and R*t* are adjusted for minimum drop in transistors Q3*b* and Q3*c*. For the above given values of a typical practical embodiment, namely with R*s* and R*t* of about 4 ohms and 8 ohms respectively, the voltages V1, V2 and V3 will all be less than one volt. The resistors R3*a*, R3*b*, R3*c*, etc. are equal which, as explained above with reference to FIG. 1, makes the voltage division between the transistors equal at the low current end of the load range. It will now be evident that under such low load current conditions the voltage drops across R*r* and R*s* become negligible as compared with the emitter to collector voltages of the transistors Q3*a*, Q3*b* and Q3*c*, and that the series transistor base currents are low as compared with the currents through R3*a*, R3*b* and R3*c*. Thus, since the voltage drops across R3*a*, R3*b* and R3*c* are equal, the voltage drops across the cascade transistors are also equal.

The above described selection of resistance values can be expressed by the following relations.

$Rr=0$, or $Rr \ll Rs$ because the base current at Q3*a* is supplied not through R3*a* but through Q*d*3. Hence:

$$Rs=R3/h_{FE};\ Rt=2R3/h_{FE}=2Rs$$
$$Ru=3R3/h_{FE}=3Rs;\ \text{etc.}$$

wherein $R3=R3a=R3b=R3c=R3d=$etc. and $h_{FE}$ is a parameter characteristic of the transistors Q3*a*, Q3*b*, Q3*c*, etc. This parameter is defined as the "common emitter static value of short-circuit forward current transfer ratio"; it is averaged over the range of output load current and can be easily obtained for any given transistor.

It will be understood that, as indicated above, any desirable number of cascade transistors Q*a*, Q*b*, Q*c*, etc. can be employed in any embodiment of the invention with any number of corresponding limiting resistance means R*a*, R*b*, R*c*, etc. or U*a*, U*b*, U*c*, etc. and equalizing resistance means R*r*, R*s*, R*t*, etc. Thus, referring to FIG. 3, a fourth resistor R*u* (not shown) would be connected between a fourth cascade transistor Q3*d* (not shown) and terminal *po*, and a resistor R3*d* (not shown) would be connected in parallel to R*u* to the base of Q3*d* if, as described above, a cascade with more than three transistors is used. The above formula, for R*u* indicates how the series R*s*, R*t*, R*u*, . . . progresses, namely with integer factors of R*s*, having in mind that R*r* is zero or very small as compared to R*s*.

In addition to insuring equal division of voltage and power between the series transistors of the cascade, this circuit has the additional advantage of permitting only very low transistor drops even at high currents.

A further very important advantage of the device according to FIG. 3 is an inherent protection against short circuits. If the output side of this regulated power supply should become short-circuited, the resistors R*s* and R*t* automatically cause the transistor voltage drops to stay low thus keeping to a minimum the peak power, at short circuit, which has to be dissipated in the cascade transistors, thus preventing damage to these transistors. Moreover, the very presence of the series resistors R*r*, R*s*, R*t* limits the maximum current that can flow through the cascade in case of a short circuit.

An additional advantage of the circuit according to FIG. 3 results from the fact that the transistor Q3*a* does not ordinarily need self-bias or protection, because its base current is determined by the driving transistor Q*d*3 which controls Q3*a*, Q3*b* and Q3*c* simultaneously. For this reason the circuit according to FIG. 3 requires only one driving means such as transistor Q*d*3, which results in a substantial saving of cost without sacrificing the inherent overload protection and equal power division. It will however be understood that more than one driver can be used; for example drivers can be used on all stages of the series cascade in order to obtain no-load operation. Also, such additional drivers permit the use of lower wattage ratings for the coupling resistors R3*a*, R3*b*, R3*c*, etc.

A still further advantage of the circuit according to FIG. 3 is its inherent self-protection in the no-load condition with open output terminals *po, no*. As the load current approaches zero, the voltage drop across the diode U3 becomes zero and therefore the reverse bias voltage for all transistors of the cascade is lost. This results in a reduction of the voltage drop across each cascade transistor to a safe value at no load, even though regulation has ceased.

While, as mentioned above, the circuit according to FIG. 3 can be made self-protecting with only one driver network such as illustrated by Q*d*3, the circuits according to FIGS. 1 and 2 can be similarly protected by adding driver transistors across Q1*b*, Q1*c*, etc. in FIG. 1, and Q2*b*, Q2*c*, etc. in FIG. 2, which will then be arranged exactly as shown for the driver transistors Q*d*1 and Q*d*2. As mentioned above with reference to FIG 3, the advantage of such additional driving components is the possibility of using lower wattage ratings for all the coupling resistors namely R1*a*, R1*b*, R1*c*, etc., and R1*m*, R1*n*, etc. of FIG. 1 and R2*m*, R2*n* of FIG. 2. Furthermore, in case of heavy current surges or short circuits on the output side, the voltage across the cascade transistors is held down, preventing damage to these transistors.

In circuits according to FIG. 2 additional driver transistors, similar to Q*d*2, across Q2*b* and Q2*c* will permit the use of avalanche diodes U*a*, U*b*, U*c*, etc., of lower current rating, but otherwise the action of the circuit according to FIG. 2 will be essentially the same as above described.

In the circuit according to FIG. 2, the voltage limited resistance element (such as an avalanche diode) beyond U*b* (as indicated in dot and dash lines at U*c* of FIG. 2) limits the voltage of Q2*c*.

The circuit according to FIG. 2 can be used with breakdown elements, such as U*a* and U*b*, only across the cascade transistor bases. If an additional element of this type is used, as indicated in dot and dash lines at U*c* of FIG. 2, the voltage across the last cascade transistor will be limited and regulation will stop above a predetermined level.

In the above described applications of the invention to voltage regulators, the series transistor cascade is connected in the positive side. However it is often desirable to put the cascade in the negative side, that is between terminals *ni* and *no*, which will not change the dimensioning and operation as above set forth.

In all embodiments, the drivers Q*d* can be connected with their collectors to the bases of the corresponding cascade transistors, instead of with their emitters, as shown.

Likewise in all embodiments, the transistor connected terminal of the first resistance means such as R1*a* in FIG. 1, U*a* in FIG. 2 and R3*a*, can be connected to the emitter of the first regulating transistor; for example the left-hand terminal of R1*a* (FIG. 1) will then be connected between U1 and Q1*a* instead of between Q*d*1 and Q1*a*, with the connection of R11 unchanged.

It will further be evident that series cascades according to the invention can be used in parallel in order to increase the power handling ability of the system in question. In voltage regulators according to the herein-described embodiments, several cascades would be connected in parallel between terminals *pi* and *po* or *ni* and *no*, with the drivers likewise arranged in parallel according to well known principles such as referred to above.

It has been found that series cascade circuits of the type herein-described can also be used for purposes of current regulation.

As pointed out above, series cascades according to the invention have uses other than in regulated power supplies. Such uses are for example in any instance where a direct current potential difference has to be varied as a function of some fluctuating regulation signal, but also in alternating current devices, for example power amplifiers where, due to non-availability of a transistor of sufficiently high voltage or power rating, a plurality of transistors can be used instead, connected in series cascade according to the present invention.

It should be understood that the present disclosure is for the purpose of illustration only and that this invention includes all modifications and equivalents which fall within the scope of the appended claims.

I claim:

1. A voltage regulator between pairs of input and output terminals comprising: a plurality of regulating transistors arranged in series between one input terminal and the corresponding output terminal, with the emitter of each transistor means directly connected to the collector of the adjacent preceding transistor looking toward said input terminal; a network connected to one of said terminal pairs for sensing and amplifying voltage fluctuations and having an output conductor for carrying a signal that is dependent on said fluctuations; driving transistor means connected with its output terminal to the base of the regulating transistor next to the input terminals, and with its input terminal connected to said output conductor of said sensing network; and a plurality of limiting resistors each connected between a different pair of regulating transistors; said resistors increasing in magnitude in approximately a doubling ratio from the input to the output of said regulator, whereby the voltage fluctuations are compensated by voltage drops at individual regulating transistors which are kept below a predetermined safe value.

2. A voltage regulator between pairs of input and output terminals comprising: a plurality of regulating transistors arranged in series between one input terminal and the corresponding output terminal, with the emitter of each transistor directly connected to the collector of the adjacent preceding transistor looking toward said input terminal; a network connected to one of said terminal pairs for sensing and amplifying voltage fluctuations and having an output conductor for carrying a signal that is dependent on said fluctuations; driving transistor means connected with its output terminal to the base to the regulating transistor next to the input terminals, and with its input terminal connected to said output conductor of said sensing network; and a plurality of limiting resistance means which are appreciably conductive only above a predetermined voltage and which are connected between the bases of adjacent pairs of said regulating transistors to be thus conductive in the direction away from the driver connected regulating transistor; each of said limiting resistance means having a respective resistance parameter, said resistance parameters respectively increasing in magnitude relative to each other toward said output terminals whereby the voltage fluctuations are compensated by voltage drops at individual regulating transistors kept below a predetermined maximum by the consecutively appearing voltage drops across said limiting resistance means.

3. A voltage regulator between pairs of input and output terminals, comprising: a plurality of regulating transistors arranged in series between one input terminal and the corresponding output terminal, with the emitter of each transistor directly connected to the collector of the adjacent preceding transistor looking toward said input terminal; a network connected to one of said terminal pairs for sensing and amplifying voltage fluctuations and having an output conductor for carrying a signal that is dependent on said fluctuations; driving transistor means connected with its output terminal to the base of the regulating transistor next to the input terminals, and with its input terminal connected to said output conductor of said sensing network; a plurality of limiting resistors each connected between the bases of a different pair of adjacent regulating transistors; and a plurality of equalizing resistors each connected between the emitter and collector of an adjacent pair of regulating transistors; said limiting resistors being equal in magnitude and said equalizing resistors increasing in magnitude relative to each other toward said output terminals, whereby the voltage fluctuations are compensated by voltage drops at individual regulating transistors which voltage drops are approximately equal below a predetermined safe value.

4. A voltage regulator between pairs of input and output terminals, comprising: a plurality of regulating transistors arranged in series between one input terminal and the corresponding output terminal, with the emitter of each transistor directly connected to the collector of the adjacent preceding transistor looking toward said input terminal; a network connected to one of said terminal pairs for sensing and amplifying voltage fluctuations and having an output conductor for carrying a signal that is dependent on said fluctuations; driving transistor means connected with its output terminal to the base of the regulating transistor next to the input terminals, and with its input terminal connected to said output conductor of said sensing network; a plurality of limiting resistors of substantially equal values and each connected between the bases of a different pair of adjacent regulating transistors; and a series of equalizing resistors connected between the emitter and collector of each adjacent pair of regulating transistors, the values of said series equalizing resistors, beginning with the second one of the series, increasing as they are progressively remote from said driven regulating transistor, proportionate to integer factors of said limiting resistors; whereby the voltage fluctuations are compensated by voltage drops at individual regulating transistors which voltage drops are approximately equal below a predetermined safe value.

5. A series transistor cascade connected from a first point to a second point and adapted to share in prescribed proportions a voltage drop from said first to said second point, comprising a plurality of transistor means each having emitter, collector and base electrodes, the first of said transistor means being connected via its emitter to said first point, said transistor means arranged in series with the emitter of each transistor means subsequent to the first connected to the collector of the next preceding transistor means through compensating resistance means and the collector of the last of said transistor means being connected via a final compensating resistance means to said second point, thereby to provide a first path between said first and second points, a second path of resistive character between said first and second points and having between its ends a series of taps equal in number to said transistor means, the tap nearest said first point being separated therefrom by resistance of a first magnitude, the succeeding taps toward said second point being separated successively from the first, each other and said second point by substantially equal resistance magnitudes larger by at least one order of magnitude than said first magnitude, the base of each of said transistor means being connected successively to a corresponding one of said taps, the magnitudes of said compensating resistance means increasing progressively from the first between the first and second transistor means to said final compensating resistance means in accordance with said prescribed proportions of voltage drop sharing in the operating region of maximum current intended to be passed by said cascade.

6. Cascade according to claim 5 including between said first point and the emitter of said first transistor means a resistance means of a magnitude to supply a reverse bias to all of said transistor means in proportion to the current passing through said cascade.

7. Cascade according to claim 6 in which said reverse bias resistance means is a diode poled in the forward direction relative to said current.

8. Cascade according to claim 5 in which the magnitude of said first compensating resistance is 0 or «R, and the magnitude of each of the following compensating resistance means is successively R, 2R, 3R . . . $n$R, where R is a real value of resistance magnitude and "$n$" is an integer which is one less than the total number of said plurality of transistor means, whereby said voltage proportions are substantially equal to each other.

9. A device of the series cascade transistor type for varying the voltage drop between two points of a line through variation of the base to collector or emitter voltage of the transistors dependent on conductivity variation of driver means connected to control a cascade transistor, comprising: a plurality of transistor means each having base, collector, and emitter electrodes and arranged in an emitter-to-collector connected series between said two points, with the emitter of each transistor means connected to the collector of an adjacent transistor means in a given direction from one of said points to the other; and a plurality of limiting resistance means each including a resistive element connected one between each pair of adjacent ones of said transistor means, said element being in series with all of the other said elements, said resistance means increasing respectively in magnitude of resistance in the direction of current flow between said two points; whereby the voltage drop across the entire cascade can be divided such that a predetermined voltage drop across each individual transistor means is kept below a predetermined safe value.

10. A device of the series cascade transistor type for varying the voltage drop between two points of a line through variation of the base to collector or emitter voltage of the transistors dependent on conductivity variation of driver means connected to control a cascade transistor, comprising: a plurality of transistor means each having base, collector and emitter electrodes and arranged in an emitter-to-collector connected series between said two points, with the emitter of each transistor means connected to the collector of an adjacent transistor means in a given direction from one of said points to the other; and a plurality of limiting resistance means each including a resistive element connected one between the respective base electrodes of each pair of adjacent ones of said transistor means, said element being in series with all of the other said elements, said resistance means increasing respectively in magnitude of resistance in the direction of current flow between said two points; whereby the voltage drop across the entire cascade can be divided such that a predetermined voltage drop across each individual transistor means is kept below a predetermined safe value.

11. A device of the series cascade transistor type for varying the voltage drop between two points of a line through variation of the base to collector or emitter voltage of the transistors dependent on conductivity variation of driver means connected to control a cascade transistor comprising: a plurality of transistor means each having base, collector and emitter electrodes and arranged in an emitter-to-collector connected series between said two points, with the emitter of each transistor means connected to the collector of an adjacent transistor means in a given direction from one of said points to the other; first plurality of limiting resistance means connected one between the respective base electrodes of each pair of adjacent ones of said transistor means, and a second plurality of equalizing resistance means connected one in the emitter-to-collector connection between each pair of adjacent ones of said transistor means, said resistance means of said second plurality increasing respectively in magnitude of resistance in the direction of current flow between said two points; whereby the voltage drop across the entire cascade can be divided such that a predetermined voltage drop across each individual transistor means is kept below a predetermined safe value.

12. Voltage regulator system of the type having first and second terminals for unregulated voltage and third and fourth output terminals for regulated voltage, a direct conductive connection between said first and third terminals, a regulating connection between said second and fourth terminals, and a device of the series cascade transistor type for varying the voltage drop between said second and fourth terminals through variation of the base to collector or emitter voltage of the transistors dependent on conductivity variation of driver means connected to control a cascade transistor, comprising: a plurality of transistor means each having base, collector and emitter electrodes and arranged in an emitter-to-collector connected series between said second and fourth terminals, with the emitter of each transistor means connected to the collector of an adjacent transistor means in a given direction from one of said second and fourth terminals to the other; a plurality of limiting resistance means each including a resistive element connected one between each pair of adjacent ones of said transistor means, said element being in series with all of the other said elements, said resistance means increasing respectively in magnitude of resistance in the direction of current flow between said second and fourth terminals and a substantially resistive connection including said driver means from at least one of said base electrodes to said direct conductive connection; whereby the voltage drop across the entire cascade can be divided such that a predetermined voltage drop across each individual transistor means is kept below a predetermined safe value.

13. Voltage regulator system of the type having first and second input terminals for unregulated voltage and third and fourth output terminals for regulated voltage, a direct conductive connection between said first and third terminals, a regulating connection between said second and fourth terminals, and a device of the series cascade transistor type for varying the voltage drop between said second and fourth terminals through variation of the base to collector or emitter voltage of the transistors dependent on conductivity variation of driver means connected to control a cascade transistor, comprising: a plurality of transistor means each having base, collector and emitter electrodes and arranged in an emitter-to-collector conneced series between said second and fourth terminals, with the emitter of each transistor means connected to the collector of an adjacent transistor means in a given direction from one of said second and fourth terminals to the other; a plurality of limiting resistance means each including a resistive element connected one between the respective base electrodes of each pair of adjacent ones of said transistor means, said element being in series with all of the other said elements, said resistance means increasing respectively in magnitude of resistance in the direction of current flow between said second and fourth terminals and a resistive connection from each of said base electrodes to said direct conductive connection, at least one of said resistive connections including said driver means; whereby the voltage drop across the entire cascade can be divided such that a predetermined voltage drop across each individual transistor means is kept below a predetermined safe value.

14. Voltage regulator system of the type having first and second input terminals for unregulated voltage and third and fourth output terminals for regulated voltage, a direct conductive connection between said first and third terminals, a regulating connection between said second and fourth terminals, and a device of the series cascade transistor type for varying the voltage drop between said second and fourth terminals through variation of the base to collector or emitter voltage of the transistors dependent on conductivity variation of driver means connected to control a cascade transistor, comprising: a plurality of transistor means each having base, collector and emitter electrodes and arranged in an emitter-to-collector connected series between said second and fourth terminals, with the emitter of each transistor means connected to the collector of an adjacent transistor means in a given direction from one of said second and fourth terminals to the other; a first plurality of limiting resistance means connected one between the respective base electrodes of each pair of adjacent ones of said transistor means, a second plurality of equalizing resistance means connected one in the emitter-to-collector connection between each pair of adjacent ones of said transistor means, said resistance means of said second plurality increasing respectively in magnitude of resistance in the direction of current flow between said second and fourth terminals and a substantially resistive connection including said driver means from at least one of said base electrodes to said direct conductive connection; whereby the voltage drop across the entire cascade can be divided such that a predetermined voltage drop across each individual transistor means is kept below a predetermined safe value.

15. A device of the series cascade transistor type for varying the voltage drop between two points of a line through variation of the base to collector or emitter voltage of the transistors dependent on conductivity variation of driver means connected to control a cascade transistor, comprising: a plurality of transistor means each having base, collector and emitter electrodes, and arranged in an emitter-to-collector connected series between said two points, with the emitter of each transistor means connected to the collector of an adjacent transistor means in a given direction from one of said points to the other; and a plurality of limiting resistance means each including a resistive element connected one between the bases, each pair of adjacent ones of said transistor means, said element being in series with all of the other said elements, said resistance means increasing respectively in magnitude of resistance in the direction of current flow between said two points; the magnitude of each of said resistance means being approximately double the magnitude of the next smaller one of said resistance means; whereby the voltage drop across the entire cascade can be substantially equally divided among said transistor means such that a predetermined voltage drop across each individual transistor means is kept below a predetermined safe value.

16. A device of the series cascade transistor type for varying the voltage drop between two points of a line through variation of the base to collector or emitter voltage of the transistors dependent on conductivity variation of driver means connected to control a cascade transistor comprising: a plurality of transistor means each having base, collector and emitter electrodes and arranged in an emitter-to-collector connected series between said two points, with the emitter of each transistor means connected to the collector of an adjacent transistor means in a given direction from one of said points to the other; and a plurality of limiting resistance means each including a resistive element connected one between the respective base electrodes of each pair of adjacent ones of said transistor means, said element being in series with all of the other said elements, said resistance means increasing respectively in magnitude of resistance in the direction of current flow between said two points; the magnitude of each of said resistance means being approximately double the magnitude of the next smaller one of said resistance means; whereby the voltage drop across the entire cascade can be substantially equally divided among said transistor means such that a predetermined voltage drop across each individual transistor means is kept below a predetermined safe value.

17. A device of the series cascade transistor type for varying the voltage drop between two points of a line through variation of the base to collector or emitter voltage of the transistors dependent on conductivity variation of driver means connected to control a cascade transistor comprising: a plurality of transistor means each having base, collector and emitter electrodes and arranged in an emitter-to-collector connected series between said two points, with the emitter of each transistor means connected to the collector of an adjacent transistor means in a given direction from one of said points to the other; a first plurality of limiting resistance means connected one between the respective base electrodes of each pair of adjacent ones of said transistor means, and a second plurality of equalizing resistance means connected one in the emitter-to-collector connection between each pair of adjacent ones of said transistor means, said resistance means of said second plurality increasing respectively in magnitude of resistance in the direction of current flow between said two points; the magnitude of each of said resistance means of said second plurality being approximately double the magnitude of the next smaller one of said resistance means of said second plurality; whereby the voltage drop across the entire cascade can be substantially equally divided among said transistor means such that a predetermined voltage drop across each individual transistor means is kept below a predetermined safe value.

18. Voltage regulator system of the type having first and second input terminals for unregulated voltage and third and fourth output terminals for regulated voltage, a direct conductive connection between said first and third terminals, a regulating connection between said second and fourth terminals, and a device of the series cascade transistor type for varying the voltage drop between said second and fourth terminals through variation of the base to collector or emitter voltage of the transistors dependent on conductivity variation of driver means connected to control a cascade transistor, comprising: a plurality of transistor means each having base, collector and emitter electrodes and arranged in an emitter-to-collector connected series between said second and fourth terminals, with the emitter of each transistor means connected to the collector of an adjacent transistor means in a given direction from one of said second and fourth terminals to the other; a plurality of limiting resistance means each including a resistive element connected one between each pair of adjacent ones of said transistor means, said element being in series with all of the other said elements, said resistance means increasing respectively in magnitude of resistance in the direction of current flow between said second and fourth terminals; the magnitude of each of said resistance means being approximately double the magnitude of the next smaller one of said resistance means; and a substantially resistive connection including said driver means from at least one of said base electrodes to said direct conductive connection; whereby the voltage drop across the entire cascade can be substantially equally divided among said transistor means such that a predetermined voltage drop across each individual transistor means is kept below a predetermined safe value.

19. Voltage regulator system of the type having first and second input terminals for unregulated voltage and third and fourth output terminals for regulated voltage, a direct conductive connection between said first and third terminals, a regulating connection between said second and fourth terminals, and a device of the series cascade transistor type for varying the voltage drop between said second and fourth terminals through variation of the base to collector or emitter voltage of the transistors dependent on conductivity variation of driver means connected to control a cascade transistor, comprising: a plurality of transistor means each having base, collector and emitter electrodes and arranged in an emitter-to-collector connected series between said second and fourth terminals, with the emitter of each transistor means connected to the collector of an adjacent transistor means in a given direction from one of said second and fourth terminals to the other; a plurality of limiting resistance means each including a resistive element connected one between the respective base electrodes of each pair of adjacent ones of said transistor means, said element being in series with all of the other said elements, said resistance means increasing respectively in magnitude of resistance in the direction of current flow between said second and fourth terminals; the magnitude of each of said resistance means being approximately double the magnitude of the next smaller one of said resistance means; and a resistive connection from each of said base electrodes to said direct conductive connection, at least one of said resistive connections including said driver means and the remaining ones of said resistive connections having relatively equal resistance values; whereby the voltage drop across the entire cascade can be substantially equally divided among said transistor means such that a predetermined voltage drop across each individual transistor means is kept below a predetermined safe value.

20. A device of the series cascade transistor type for varying the voltage drop between two points of a line through variations of the base to one of the collector and emitter voltage of the transistors dependent on conductivity variation of driver means connected to control a cascade transistor comprising:

a plurality of transistor means arranged in emitter-collector connected series between said two points so that the direction of current flow therethrough is from the first to the second of said points;

a plurality of limiting resistance means, each of which includes a resistive element which is connected between a corresponding pair of adjacent ones of said transistor means, said element being in series with all of the other of said elements;

each of said limiting resistance means including a respective resistance parameter, each successive resistance parameter in the direction of said current flow having a magnitude greater than the preceding parameter;

whereby the voltage drop across the entire cascade is distributed so that the voltage drop across each individual transistor means is kept below a predetermined safe value.

21. A device according to claim 20 wherein the conductivity of each one of said resistance parameters is substantially equal in either direction of voltage drop so that all of the voltage drops across each individual transistor means are simultaneously variable.

22. A device according to claim 20 wherein said resistance parameters each comprise a unilateral conductive element connected between the bases of adjacent transistor means, said elements being appreciably conductive only above a predetermined voltage and connected to be thus conductive in said direction of current flow so that the voltage drops across the individual transistor means consecutively reach but do not exceed said safe value.

23. A device of the series cascade transistor type for varying the voltage drop between two points of a line through variations of the base to one of the collector and emitter voltage of the transistors dependent on conductivity variation of driver means connected to control a cascade transistor comprising:

a plurality of transistor means arranged in emitter-collector connected series between said two points so that the direction of current flow therethrough is from the first to the second of said points;

a plurality of limiting resistance means, each of which is connected between a corresponding pair of adjacent ones of said transistor means;

each of said limiting resistance means including a respective resistance parameter, each successive resistance parameter in the direction of said current flow having a magnitude greater than the preceding parameter;

the conductivity of each one of said resistance parameters being substantially equal in either direction of voltage drop so that all of the voltage drops across each individual transistor means are simultaneously variable, whereby the voltage drop across the entire cascade is distributed so that the voltage drop across each individual transistor means is kept below a predetermined safe value, each limiting resistance means comprising a resistor between the base of adjacent transistor means, all of the resistors being substantially equal in value;

and each of said resistance parameters comprising an equalizing resistance means connected between the respective emitter and collector of adjacent transistor means so as to reduce the voltage across each transistor means when a comparatively high current flows therebetween.

24. A device according to claim 23 wherein the values of said equalizing resistance means differ from one another by increments proportional to consecutive integral multiples of the value of one of said resistors.

References Cited in the file of this patent

UNITED STATES PATENTS

| | | |
|---|---|---|
| 2,832,900 | Ford | Apr. 29, 1958 |
| 2,884,545 | Houck | Apr. 28, 1959 |
| 2,903,640 | Bixby | Sept. 8, 1959 |
| 2,915,693 | Harrison | Dec. 1, 1959 |
| 2,922,945 | Norris et al. | Jan. 26, 1960 |
| 2,957,993 | Sichling | Oct. 25, 1960 |
| 2,967,991 | Deuitch | Jan. 10, 1961 |
| 2,999,984 | Beck | Sept. 12, 1961 |

FOREIGN PATENTS

| | | |
|---|---|---|
| 451,993 | Italy | Oct. 4, 1949 |

OTHER REFERENCES

"Designing Transistor Circuits—D.C. Regulators," R. B. Hurley, Electronic Equipment, April 1957, pp. 20–23.